Fig. 1-a
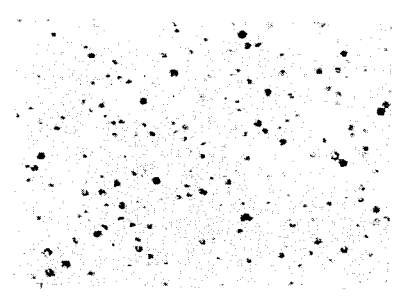
Fig. 1-b
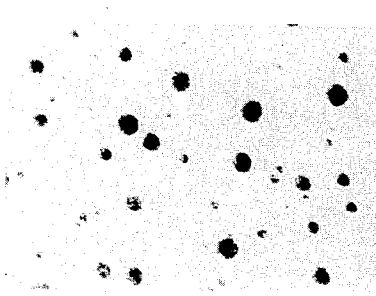
Fig. 1-c
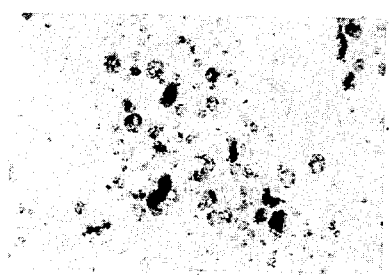
Fig. 2
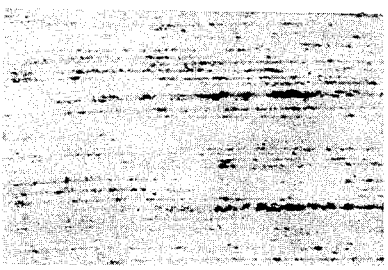
Fig. 3-a
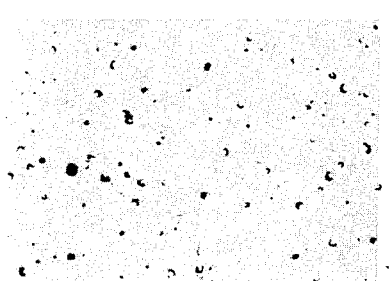
Fig. 3-b
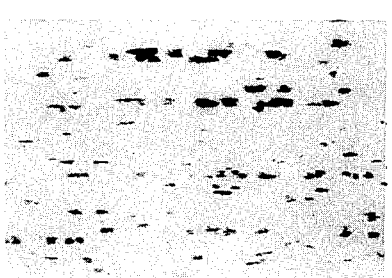

Fig. 4
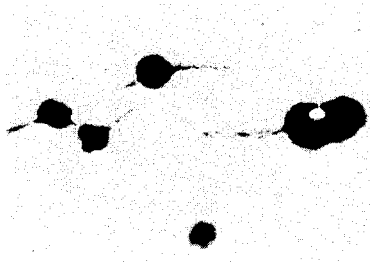
Fig. 5-a
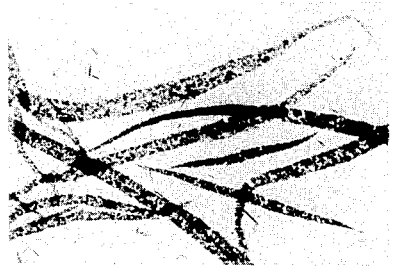
Fig. 5-b
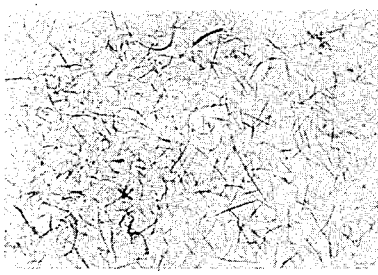
Fig. 6
Fig. 7-a
Fig. 7-b

Fig. 7-c
Fig. 7-d
Fig. 8-a
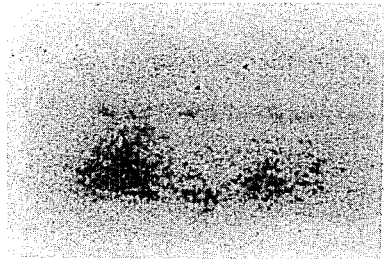
Fig. 8-b
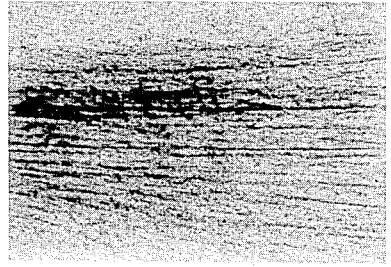
Fig. 8-c
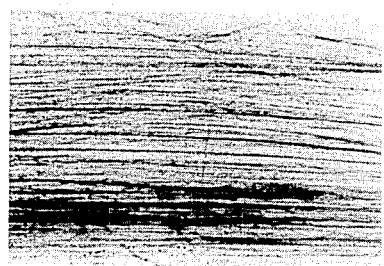
Fig. 8-d
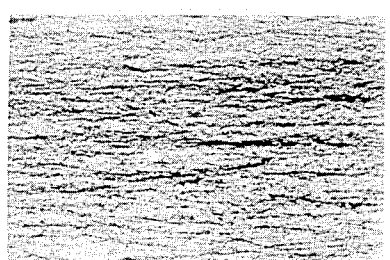

United States Patent Office 3,639,502
Patented Feb. 1, 1972

3,639,502
ANTISTATIC SHAPED ARTICLES CONTAINING POLYETHERPOLYAMIDE BLOCK COPOLYMER AND A POLYAMIDE, POLYESTER OR POLYOLEFIN
Kaoru Okazaki, Yoichi Shimokawa, and Taneo Maeda, Nagoya, Keisuke Igawa, Aichi-ken, Chikatsu Okagawa, Nagoya, and Koichi Kato, Ohtsu-shi, Japan, assignors to Toray Industries, Inc., Tokyo, Japan
Filed July 19, 1968, Ser. No. 746,124
Claims priority, application Japan, July 27, 1967, 42/47,905
Int. Cl. C08g 41/04
U.S. Cl. 260—857 R 6 Claims

ABSTRACT OF THE DISCLOSURE

A synthetic resin polymer such as polyamide, polyester and polyolefin and polyether-polyamide block copolymer are shaped in a blended condition to obtain a shaped article. In the shaped article, the block copolymer is dispersed in the form of slender particles as an independent phase wherein the longitudinal axes of the particles are arranged in parallel relationship with the direction of the molecular orientation of the shaped article. At least 80% by weight of the dispersed particles of the block copolymer have a diameter at cross section of not more than 1.0 micron and a length in the direction of longitudinal axes at least 20 times the diameter at cross section. Polymer blend shaped articles having such an internal structure have very excellent properties as a synthetic resin and also excellent antistatic properties.

This invention relates to a synthetic resin having high antistatic properties.

In recent years, the development of synthetic resins has been remarkable, and such resins have found a considerably wide range of applications as fibers, bristles and films. It is because of an effective utilization of excellent physical and chemical properties that these synthetic resins are so widely used. These resins, however, have common defects, an example of which is their tendency to static charge. In the fields of fibers and films in particular, the static charge constitutes a great setback. For instance, it often causes troubles during the course of manufacturing and processing fibers and films, involving an increased degree of contamination in final products, and causes discomfort at the time of putting off garments made from such resins.

Many improvements have been attempted heretofore with an eye on this kind of problem. One method of improvement, which has been put into practice from old, consists in coating the surface of a synthetic resin with a hydrophilic material, and the method generally termed "oiling" in fiber processing also falls into the category of this method. The method, however, does not provide a permanent effect since it merely gives a surface coating, and the effect decreases with the dropping of the material coated on the surface. The next measure against the defect was to incorporate an antistatic agent into a synthetic resin. For instance, a method has been known which attempted at static prevention by incorporating a polyalkylene ether glycol as an independent phase uniformly into a synthetic resin such as polyamide. But this method either does not result in complete static prevention (see, for instance, British Pat. 990,713 and U.S. Pat. 3,329,557), because the polyalkylene ether glycol present as dispersed particles in the synthetic resin tends, owing, to its water solubility, to be extracted and removed in a post-treatment step such as scouring and in repeated washing in water, and cannot provide permanent antistatic properties.

Furthermore, according to this method, the polyalkylene ether glycol is separated from the polyamide in the blend since there is no compatibility between these two components, and the polylakylene ether glycol is present as thick and short dispersed particles (see FIG. 4 and FIGS. 5–a and 5–b), making it impossible to give shaped articles having fully satisfactory antistatic properties.

With a view to improving the above-mentioned defects, we proposed a new method covered by U.S. Ser. No. 614,827, now abandoned, a continuation-in-part of which was filled Mar. 21, 1969, as U.S. Ser. No. 809,421, now U.S. Pat. 3,549,724, and disclosed that filaments having excellent antistatic properties can be obtained by mixing a small amount of a polyether-polyamide block copolymer having a relatively large content of the polyalkylene ether with a polyamide resin or with polyester resin U.S. Ser. No. 703,243 (Feb. 6, 1968), now U.S. Pat. 3,522,329, and melt-spinning the resulting mixture.

We have further improved this method, and arrived at the present invention which gives synthetic resin shaped articles having more excellent antistatic properties.

Accordingly, an object of the invention is to provide permanently antistatic shaped articles such as fibers, bristles and films of melt-shapable synthetic resins such as polyamides, polyesters and polyolefins. Specifically, the invention provides synthetic resin shaped articles having permanently excellent antistatic properties by incorporating into said melt-shapable synthetic resins a specific polyether-polyamide block copolymer in a specific dispersed state.

The synthetic resin shaped articles having antistatic properties, as used in the invention, are melt-shapable synthetic resins having a molecular orientation, wherein particles of the polyether-polyamide block copolymer are dispersed in a state as mentioned below. Slender polyether-polyamide block copolymer particles are dispersed in the synthetic resin as an independent phase with their longitudinal axis being in approximately parallel relationship with the direction of their molecular orientation. In addition, at least 80% of said particles have a diameter at cross section of not more than $1.0\mu$, preferably not more than $0.4\mu$, more preferably $0.01$–$0.2\mu$, and have a length in their longitudinal axis at least 20 times, preferably at least 100 times, more preferably at least 200 times, and most preferably at least 500 times their diameter at cross-section.

With reference to the accompanying drawings:

FIGS. 1–a, 1–b and 1–c are electron microscopic photographs (magnification 40,000) of the cross sections of the filaments of the invention (see Examples 3, 9 and 10);

FIG. 2 is an electron microscopic photograph (magnification 40,000) of the longitudinal section of the filament of the invention (see Example 9);

FIG. 3–a is an electron microscopic photograph (magnification 40,000) of the cross section of the filament of Comparative Example 2;

FIG. 3–b is an electron microscopic photograph (magnification 40,000) of the longitudinal section of the filament of Comparative Example 2;

FIG. 4 is an electron microscopic photograph (magnification 20,000) of the cross section of the filament of Comparative Example 3;

FIG. 5–a is an electron microscopic photograph (magnification 6,000) of the filament of Comparative Example 3 in accordance with a solvent dissolving method;

FIG. 5–b is an optical microscopic photograph (magnification 300) of the filament of Comparative Example 3 in accordance with a solvent dissolving method;

FIG. 6 is an electron microscopic photograph (magnification 10,000) of the filament of Example 10 in accordance with a solvent dissolving method;

FIGS. 7–a, 7–b, 7–c and 7–d are electron microscopic photographs (magnification 20,000) of the filaments of Example 11 in accordance with a solvent dissolving method, wherein FIG. 7–a refers to the filament having 15% by weight of a polyether component in a polyether-polyamide block copolymer, FIG. 7–b refers to the filament having 30% by weight of a polyether component in a polyether-polyamide block copolymer, FIG. 7–c refers to the filament having 45% by weight of polyether component in a polyether-polyamide block copolymer, and FIG. 7–d refers to the filament having 60% by weight of a polyether component in a polyether-polyamide block copolymer;

FIGS. 8–a, 8–b, 8–c and 8–d are optical microscopic photographs (magnification 200) of the filaments of Example 11 in accordance with a solvent dissolving method, wherein FIG. 8–a refers to the filament containing 15% by weight of a polyether component in a polyether-polyamide block copolymer, FIG. 8–b refers to the filament containing 30% by weight of a polyether component in a polyether-polyamide block copolymer, FIG. 8–c refers to the filament containing 45% by weight of a polyether component in a polyether-polyamide block copolymer, and FIG. 8–d refers to the filament containing 60% by weight of the polyether component in a polyether-polyamide block copolymer;

Figure 9:
FIG. 9 is an electron microscopic photograph (magnification 10,000) of Specimen A of Example 1 in accordance with a solvent dissolving method.

A method of observing the state of a polyether-polyamide block copolymer dispersed in the synthetic resin shaped article of the present invention will be explained below.

An osmic acid solution having a concentration of 1% by weight is heated to 52±5° C. In a vapor of the solution, a specimen of such a shaped article as filament, bristle and film is left to stand for about 48 hours. The specimen is dyed deep black, and the dyed specimen in washed thoroughly with water. The so obtained osmic acid dyed specimen is cut by a microtome in a customary manner to make a superthin section cut transversely or a superthin section cut longitudinally. When an electron microscopic photograph is taken of this section, a portion containing a polyalkylene ether is observed as a deeply dyed portion because it has strongly absorbed osmic acid. Consequently, the polyether-polyamide block copolymer phase dispersed in the synthetic resin phase is observed as a portion ranging from a dark grey color to a black color with a varying shade. The magnification of an electron microscope is suitable in the range of 5,000 to 100,000. In the transversely cut thin section, the cross section of the polyether-polyamide block copolymer is not necessarily observed as a circle, but usually an alliptical to distorted circular shape. In the present invention, the diameter at cross section of the block polyetheramide phase is defined as an arithmetic mean of the maximum diameter and minimum diameter (FIGS. 1–a, 1–b and 1–c).

From an electron mircroscopic photograph of a longitudinally cut superthin section, it is possible to determine the length of said dispersed phase in a direction of a longitudinal axis (FIG. 2). Generally, however, it is very complicated and difficult to prepare a longitudinally cut thin section of a synthetic resin shaped article. As the plane of the obtained longitudinally cut superthin section need be parallel with the direction of a longitudinal axis in order to determine the length in the direction of a longitudinal axis accurately, the preparation of such a section becomes more difficult. The following method has consequently been devised a simpler way of determining the length of a dispersed phase of a polyether-polyamide block copolymer in the direction of its longitudinal axis.

A small amount of a suitable solvent such as formic acid and O-chlorophenol is added dropwise to a specimen dyed with osmic acid to dissolve a synthetic resin portion which is a principal ingredient. A polyether-polyamide block copolymer phase remaining insoluble in the solvent by the fixing action of the absorbed osmic acid is directly observed. If this method is used, either an electron microscopic photograph or an optical microscopic photograph can be used according to the purpose. This method makes it possible to directly observe the shape of a very slender dispersed phase without practising a difficult operation of getting a longitudinaly cut super-thin section. In this case, not only is it possible to determine the length in the direction of a longitudinal axis, but also an approximate value of the diameter at cross section by measuring the width. As a synthetic resin portion is dissolved by this method, however, the dispersed phase naturally changes its original position, and it is impossible to observe the orientation of the dispersed phase.

When a transversely cut superthin section of an article of a synthetic resin obtained by mixing a polyamide resin as an example of the melt-shapeable synthetic resin and a polyether-polyamide block copolymer is observed by an electron microscopic photograph, the polyetherpolyamide block copolymer is observed as a portion having spots coloured from black grey to black with a varying shade (FIG. 1). A portion dyed particularly deep black is considered to correspond to an aggregation of polyalkylene ether chains of the polyether-polyamide block copolymer molecule.

FIG. 2 shows a typical electron microscopic photograph of the longitudinally cut superthin section, from which it is noted that the polyether-polyamide block copolymer is present as very slender particles on the whole, and all of these slender particles are oriented in parallel relationship with each other in a certain direction in an elongated condition. In the present invention, the longitudinal direction of these slender particles is termed longitudinal axis.

The above fact becomes clearer if the polyamide portion is dissolved by treatment of the osmic acid dyed specimen with formic acid, and the remaining polyether-polyamide block copolymer portion is observed by an electron or optical microscopic photograph. It is clear that in the present invention, the polyether-polyamide block copolymer is present as very slender particles (see FIG. 6). By observing it with a widened or moved visual field, it is possible to determine an approximate length of each of the slender dispersed particles.

FIG. 6 shows that slender polyether-polyamide block copolymer particles are present in a winding state. This state is brought about when the synthetic resin portion is dissolved. If the same specimen is observed by using a longitudinally cut superthin as in FIG. 2, all the particles are seen to be oriented in parallel relationship with each other.

FIGS. 5–a and 5–b refer to the filaments from a mere mixture of a polyamide resin with a polyalkylene glycol, and show that the diameters of the particles are large and their lengths are short as compared with the synthetic resin shaped article of the present invention. According to the method of mixing a polyalkylene glycol, the length of dispersed particles of polyalkylene glycol is at most 20–30 times their diameter, and it is practically very difficult or impossible to make slenderer dispersed particles present.

The above is applicable to a case of mixing the polyether-polyamide block copolymer of the invention with other synthetic resin than polyamide. Although there is some difference in respect of compatibility, it is possible to achieve approximately the same dispersed state.

The melt-shaping used in the present invention is a shaping in which a molten material is extruded from a spinneret and then subjected to drafting in an extruding direction, and ordinarily, the material is further stretched after shaping. Such-shaped articles include filaments, bristles and films, but the present invention is most preferably applicable to filaments. In such melt-shaped articles, the orientation of molecules takes place in the direction of drafting and stretching, and this direction is called a direction of molecular orientation.

We have extensively examined the dispersed states of a polyether-polyamide block copolymer present as slender particles in the synthetic resin shaped articles of the present invention, and found that in order for the synthetic resin shaped articles of the invention to exhibit excellent antistatic properties, it is essential that the dispersed phase of the polyether-polyamide block copolymer present therein should satisfy conditions. Specifically, it is essential that the polyether-polyamide block copolymer incorporated in the synthetic resin shaped article should be dispersed as particles having a certain size without being dissolved uniformly and very finely in the synthetic resin article, and that the particles should be present as slender stripes. Slender polyether-polyamide block copolymer particles are dispersed in the synthetic resin with their longitudinal axis being in approximately parallel relationship with the direction of their molecular orientation. In addition, at least 80% of said particles have a diameter at cross section of not more than $1.0\mu$, preferably not more than $0.4\mu$, more preferably $0.01-0.2\mu$, and have a length in their longitudinal axis at least 20 times, preferably at least 100 times, more preferably at least 200 times, and most preferably at least 500 times their diameter at cross section. If the diameters at cross section of the dispersed particles of a polyether-polyamide block copolymer get too high, antistatic effect and dyeing fastness markedly decrease. On the other hand, if the length of the dispersed particle in a direction of the longitudinal axis is less than 20 times its diameter, the antistatic property is poor likewise. The longer is the particle, the better is the antistatic effect. Furthermore, if the polyether-polyamide block copolymer is dispersed finely and uniformly to such an extent that it cannot be easily observed as an indepndent phase, the antistatic effect is also on the decrease.

As described above, in order for a synthetic resin shaped article containing a polyether-polyamide block copolymer to exhibit excellent antistatic properties, it is absolutely necessary that the polyether-polyamide block copolymer should be dispersed in the state specified above. In the following, the description will be directed to a method of obtaining synthetic resin shaped articles having such an internal structure.

We have already proposed a method of obtaining an antistatic synthetic resin shaped article by melt-mixing a polyether-polyamide block copolymer with a polyamide resin as an example of the melt-shapable synthetic resin, and pointed out that the following conditions (1), (2) and (3) need be satisfied in order for the final article to exhibit an excellent static prevention.

(1) The polyether component present in the polyether-polyamide block copolymer should be in an amount of 15–70% by weight, particularly 20–60% by weight.

(2) The polyether segments in the polyether-polyamide block copolymer should preferably have at least 45, preferably 65–150, ether-linked oxygen atoms on an average per one polyether segment.

(3) The ratio of the polyether-polyamide block copolymer to be mixed with polyamide is such that the polyalkylene ether content may be 0.1–20%, preferably 0.3–10%, most preferably 0.3–5% based on the total weight of said block copolymer and polyamide.

We have furthered our research, and found other very important conditions besides above mentioned conditions (1), (2) and (3). These conditions are as follows:

(4) The ratio of the melt viscosity of a polyamide at the melt-shaping temperature to that of a polyether-polyamide block copolymer at the same temperature should be within a certain suitable range.

(5) A cooling and solidifying process after the synthetic resin has left a spinneret of a melt-shaping machine is of utmost importance. The ratio ( to be referred to as draft) of the linear speed at the moment of leave from the spinneret to the linear speed at the time of wind-up should be above a predetermined value.

(6) time during which both polymers are kneaded with each other in a melt-shaping machine should be as short as possible. In addition, such a melt-shaping machine should be used as will not knead the polymers too much.

Figure 11:
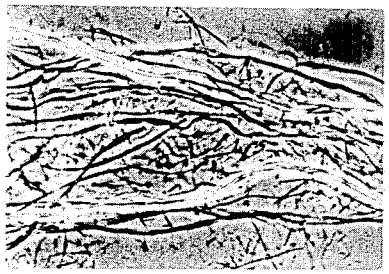
FIG. 11 is an optical microscopic photograph (magnification 660) of the filament of Example 6 in accordance with a solvent dissolving method.
Figure 12:
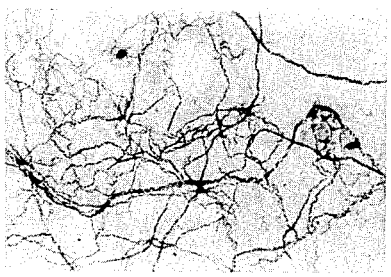
FIG. 12 is an electron microscopic photograph (magnification 10,000) of the filament of Example 8 in accordance with a solvent dissolving method.

It has been discovered that if conditions (4), (5) and (6) are satisfied besides the conditions (1), (2) and (3) filaments having better antistatic properties can be obtained. We have also found that these conditions are applicable not only to the blending of a polyamide with a polyether-polyamide block copolymer, but to the blending of a polyether-polyamide block copolymer with other melt-shapable synthetic resin such as polyethylene terephthalate and polypropylene. In other words, the conditions (1), (2), (3), (4), (5) and (6) can be applied not only to polyamides, but also to other synthetic resins. (FIGS. 11 and 12).

These conditions are closely related with each other, for instance, the optimum range of the melt viscosity depends on the composition of a polyether-polyamide block copolymer. It is not necessary however that all of the above conditions (1) to (6) should be satisfied in order for a synthetic resin shaped article containing a polyether-polyamide block copolymer to take the structure of dispersion as specified in the invention. For example, if conditions (1), (4), (5) and (6) are satisfied and conditions (2) and (3) are outside the scope specified in the invention but near the borderline of the scope of the condition, it is possible to obtain a synthetic resin shaped article having considerably excellent antistatic properties. Generally speaking, condition (1) and (4) are important among the above conditions, and unless conditions (1) and (4) are satisfied, the antistatic property is poor. But as a matter of course, when conditions (1) to (6) are all satisfied, a synthetic resin shaped article having most excellent antistatic properties can be obtained.

That the synthetic resin shaped article of the invention takes the specific dispersed structure as described above is a critical feature of the present invention. There may be many embodiments of preparing such shaped article, but the invention is in no way limited by these embodiments.

Some representative examples of achieving such a dispersed state will be given below.

A polyester-polyamide block copolymer containing 15–85% by weight, preferably 20–70% by weight, and more preferably 30–60% by weight of a polyalkylene ether component is prepared. It is mixed with a polyamide or other melt-shapable synthetic resin. It is necessary that the melt viscosity of the polyether-polyamide block copolymer at melt-shaping temperature should be 0.9–10 times, preferably 1.5–8.0 times, and more preferably 2.0–6.0 times, that of the polyamide or other melt-shapable synthetic resin at the same temperature. The effect of the melt viscosity is clear from Example 1 (FIGS. 9 and 10), for instance. It is further important that the time of mixing these polymers in molten state should be within one hour, preferably within 45 minutes, more preferably within 30 minutes, and still more preferably within 15 minutes. Moreover, it is not preferable to use such a melt-shaping apparatus which will exert a large shear stress in the molten and mixed condition in kneading these polymers. In this sense, an extruder-type melt-shaping apparatus is not preferred. As the shaping apparatus, preferable are such as Grid lattice type and hot plate type which exert only a very small shear stress. It is also preferable that the shaping should be conducted under such a condition as will give the largest possible draft, and it is important that the draft should be at least 10, and preferably at least 20.

From the above description, it will be easy for those skilled in the art to select productional conditions for obtaining synthetic resin shaped articles having the specific structure of dispersion specified in the invention.

The polyether-polyamide block copolymer is a block copolymer wherein the polyalkylene ether chain is connected with the polyamide chain in a straight chain fashion, and is prepared by using a polyalkylene ether having an amino group or carboxyl group at at least one end. Such polyether-polyamide block copolymer is produced by any of the following methods.

(A) Polycondensing polyamide-forming monomers such as lactams, ω-amino acids, or diamines and dicarboxylic acids in the presence of a polyalkylene ether having an amino group at at least one end or its organic acid salt.

(B) Polycondensing said polyamide-forming monomers in the presence of a polyalkylene ether having a carboxyl group at at least one end or its organic amine salt.

(C) Polycondensing a polyalkylene ether having an amino group, carboxyl group or both an amino group and a carboxyl group at at least one end with a polyamide having a carboxyl group (when the polyalkylene ether has an amino group at one of the ends), an amino group (when the polyalkylene ether has a carboxyl group at one of the ends), or both an amino group and a carboxyl group at the ends in a solution or molten condition.

To prepare the block copolymer used in the invention, it is preferable to employ the above method (A). Particularly advantageously, polyamide-forming monomers such as lactams, ω-amino acids, or diamines and dicarboxylic acids are heated to a temperature of 200 to 270° C. in the presence of a salt composed of a polyalkylene ether having an amino group at both ends and an aliphatic or aromatic dicarboxylic acid to thereby effect polycondensation reaction. The most advantageous is the use of lactams in this process.

The polyamide-forming monomers of the invention include:

(1) Lactams expressed by the following formula

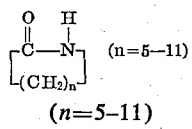

($n=5-11$)

(2) Aliphatic ω-amino acids expressed by the following formula

HOOC—$(CH_2)_n$—$NH_2$  ($n=5-11$)

(3) Aliphatic diamines expressed by the following formula $H_2N$—$(CH_2)_n$—$NH_2$  ($n=6-12$)

and m-, p-xylylene diamines, m-, p-phenylene diamine and their lower alkyl substituted derivatives.

(4) Aliphatic dicarboxylic acids expressed by the following formula

HOOC—$(CH_2)_n$—COOH  ($n=4-10$)

and isophthalic acid, terephthalic acid, and their lower alkyl substituted derivatives.

These polyamide-forming monomers can be used either alone or in the form of a copolymer, but do not include such combinations of monomers which are incapable of being melt-polymerized or will give polymers which cannot be melt-shaped because of an excessively high melting point or readiness to thermal decomposition. For instance, if 6T salt from hexamethylenediamine and terephthalic acid or PXD-6 salt from p-xylylenediamine and adipic acid is used alone, the resulting polymer has too high a melting point to be melt-shaped. Hence, they are unsuitable as the polyamide-forming monomers used in the invention. Furthermore, polyoxamide, a polyamide from oxalic acid and diamine, is also unsuitable as the polyamide component of the invention. Oxalic acid or its diamine salt is thermally unstable, and tends to be heat decomposed. When, therefore, polyoxamide is melt-polymerized, oxalic acid is heat decomposed, and the molar balance between dicarboxylic acid and diamine fails, making it impossible to obtain a polymer having a high molecular weight. It is impossible therefore to produce polyoxamide by an ordinary melt-polymerization method, and a special polymerization procedure should be used in which an ester of oxalic acid is used in a solvent. In addition, if a straight-chain diamine is used as a diamine to be polymerized with oxalic acid, the resulting polymer has too high a melting point to be melt-shaped. It is necessary therefore to use a branched-chain diamine in order for a resulting polymer to have a lower melting point. Because of the branched structure, it undesirably affects heat stability and other properties of the polymer.

As the polyalkylene ether, we use polyethylene oxide, polypropylene oxide, polytetramethylene oxide and copolymers of these, especially preferable being polyethylene oxide. These polyalkylene ethers are used in the form in which an amino group or carboxyl group is introduced into at least one end, and polyether-polyamide block copolymers are produced from them in accordance with the above-mentioned method.

Polyalkylene ethers are generally obtained as polyalkylene ether glycols having a hydroxyl group at both ends. A method has been proposed in German Pat. 1,224,031 in which polyether-polyamide block copolymers are prepared by polycondensing these polyalkylene glycols directly with polyamide oligomers or linking both components with each other by using diisocyanates, and are incorporated as antistatic agents into polyamides. According to this method, polyether-polyamide block copolymers are synthesiszed by direct polycondensation of polyalkylene glycols with polyamides having a carboxyl group at both ends. In this case, both components are linked with each other via an ester linkage, and for this reason, it is impossible to prepare polyether-polyamide block copolymers having a high molecular weight. Because such polyether-polyamide block copolymers having a low molecular weight are too low in melt viscosity at the time of melt-shaping, they cannot be dispersed in the form of stripes which are very slender in a direction of the longitudinal axis. In addition, because of incompatibility between polyalkylene glycols and polyamide oligomers, various troubles occur in manufacturing the polyether-polyamide block copolymers. When the diisocyanates are used, the obtained polymers become gelled, and a considerable portion is insoluble and infusible. The resulting polyether-polyamide block copolymers, in admixture with other melt-shapable synthetic resin, cannot be melt-shaped. For these reasons, polyether-polyamide block copolymers synthesized by using polyalkylene glycols having a hydroxyl group at both ends directly are unsuitable for achieving the objects of the invention, and should be excluded. To achieve the objects of the invention advantageously, it is necessary to use a polyether-polyamide block copolymer produced from a polyalkylene ether having an amino group or carboxyl group at at least one end as a starting material. It is especially preferable to use a polyalkylene ether having an amino group at both ends.

The polyether-polyamide block copolymer is sometimes obtained in a form containing in part a polyamide and polyalkylene ether, but such a polyether-polyamide block copolymer is also within the scope of the invention.

The synthetic resins contemplated by the invention are melt-shapable synthetic resins including polyamide homopolymers and copolymers, polyesters such as polyethylene terephthalate and its copolymers, and polyolefins such as polyethylene and polypropylene.

These polyether, polyamide block copolymers, polyamides, polyesters and polyolefins may contain a minor amount of other known copolymerization component ordinarily used. As a matter of course, such a known additive usually used as a viscosity stabilizer, delusterant, heat stabilizer, photostabilizer, pigment and other synthetic resins may be incorporated into them.

The polyether-polyamide block copolymers are mixed with synthetic resins and are melt-shaped in either of the following manners.

(i) Chips of both polymers are well mixed, and the mixture is shaped in a customary manner into filaments, guts or films by feeding it into a melt-shaping machine.

(ii) Each of the polymers is melted individually, and then both molten polymers are mixed with each other in molten state. Thereafter, the resulting mixture is shaped into filaments, guts or films in a customary manner.

The shaped articles of the invention also include a sheath-and-core or a bimetal type composite filament composed of a synthetic resin composition containing a polyether-polyamide block copolymer as one component and other synthetic resin as other component.

The measuring methods used in the invention are as follows:

Specific resistance

Filaments to be measured are put into a 0.2 wt. percent aqueous solution at 40° C. of a commercially available anionic, weakly alkaline detergent, and washed with an electric washer for 2 hours. After washing with water and drying, the electric resistance R ($\Omega$) of a filament having a length of 10 cm. and a size of 1000 denier is measured by using a super insulation meter (produced by Rigaku Denki, Japan) at a direct current voltage of 100 volts, a temperature of 25° C. and a relative humidity of 40%. The specific resistance [$\delta(\Omega)\cdot$cm.)] is calculated from R ($\Omega$) in accordance with the following equation.

$$\delta(\text{specific resistance}) = \frac{R \times D}{9 \times L \times d} \times 10^{-5}$$

D: a total denier of a specimen
L: a length (cm.) of a specimen
d: a density (g./cm.³) of a specimen Frictionally charged voltage A knitted fabric is made by using drawn filaments, and washed in the same manner as in the case of measuring the specific resistance. The so treated knitted fabric is rubbed with a polyester film by a certain method, and the frictionally charged voltage generated is measured, by using a rotary static tester in an atmosphere having a temperature 25° C. and a relative humidity of 40%.

Statically charged voltage on human body

A carpet is made from the filaments. It is placed on a grounded iron bar. A person wearing shoes made of ox leather walks on the carpet, and the statically charged voltage generated in the person is measured. The minimum statically charged voltage to which human beings are sensitive anyhow is about 3000–3500 volts, and a charged voltage of above 3500 volts is undesirable as they never fail to feel it. The temperature at the time of measureme is 25° C. and the relataive humidity, 30%. The carpet and the shoes have been left to stand for three days in a room having the above temperature and humidity before the measurement.

Melt viscosity

A polymer in chip form is heated and dried under reduced pressure of below 1 mm. Hg to lower the water content to less than 0.01% by weight. One gram of the chips is quickly put into Koka type flow tester (produced by Shimazu Seisakusho, Japan) heated to a measuring temperature, and melted for 5 minutes. Thereafter, its melt viscosity is measured.

The invention will further be described by the following non-limitative examples in which all parts are by weight.

EXAMPLE 1

Polyethylene glycol having a number average molecular weight of about 4200 was reacted with acrylonitrile in the presence of an alkali catalyst. Subsequent hydrogenation reaction of the reaction product gave a polyethylene ether diamine having an amino group at both ends. The polyethylene ether diamine was reacted with an equimolar amount of adipic acid to form polyethylene ether diamine adipic acid salt. The obtained salt was mixed with $\epsilon$-caprolactam and a minor amount of acetic acid as a viscosity stabilizer, and the mixture was polymerized for 12 hours at 240° C. to give a polyether-polyamide block copolymer of different molecular weight having 45% on an average of the polyethylene ether portion. By varying the amount of acetic acid, several kinds of polyether-polyamide block copolymer were obtained.

Chips of each of the obtained polyether-polyamide block copolymers were well mixed with chips of polycapramide at a weight ratio of 1:24 in a solid condition, and the mixture was melt-spun at 260° C. by means of a hot plate heating type spinning apparatus (the residence time in the apparatus 15 minutes; the draft 35.0; take-up speed 900 m./min.). Further drawing gave filaments with a monofilament denier of 18 having a Y-shaped cross section for use in making carpets. The content of the polyether-polyamide block copolymer in the filament was 4% by weight of the total amount, and the polyethylene ether content was 1.8% by weight of the total amount.

The melt viscosities of the polyether-polyamide block copolymer and polycapramide, the state of dispersion of the polyether-polyamide block copolymer in the obtained filament, and the antistatic properties of these filaments (statically charged voltage on human body and specific resistance) are shown in Table 1—1. The table also gives results with respect to filaments obtained from polycapramide alone.

Figure 10:
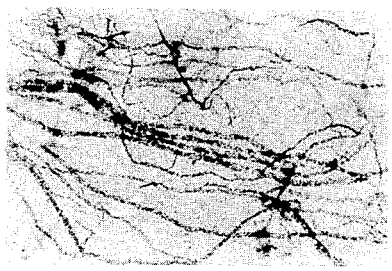
FIG. 10 is an electron microscopic photograph (magnification 10,000) of Specimen D of Example 1 in accordance with a solvent dissolving method.

It is seen from the microscopic observation that the relation between the melt viscosity of polyether-polyamide block copolymer and that of polycapramide remarkably affects the dispersed state of the polyether-polyamide block copolymer in the filaments. Table 1—1 makes it clear that antistatic properties are effected by the state of dispersion. As representative examples, an electron microscopic photograph of specimen A in accordance with formic acid dissolving method is shown in FIG. 9, and an electron microscopic photograph of specimen D, in FIG. 10. Specimen A had a large statically charged voltage on human body, and a person walking on a carpet made from it felt a violent shock on contact with a metal to the same degree as in the case of a carpet of poly-$\epsilon$-capramide. On the other hand, specimen B having a melt viscosity ratio of 0.9 gave hardly any shock, and was satisfactory to some extent. Specimens C, D, E and F which had a higher melt viscosity ratio did not give any shock at all. Specimen G gave almost no shock. Specimen H gave some shock because of excessively large melt viscosity of polyetheramide, and did not give excellent filaments because unevenness in denier occurred during spinning.

TABLE 1-1

| | Melt viscosity (poise)[a] | | | Dispersed state of polyether-polyamide block copolymer | | Antistatic properties | |
|---|---|---|---|---|---|---|---|
| | Polyether-polyamide block copolymer | Polycapramide | Ratio of melt viscosity[b] | Diameter at cross section of dispersed particles[c] ($\mu$) | Length/diameter (dispersed particle) | Statically charged voltage on human body (v.) | Specific resistance of filament ($\Omega$.cm.) |
| Specimen: | | | | | | | |
| A | 720 | 1,500 | 0.5 | <0.03 | <50 | 5,000 | $7.0 \times 10^9$ |
| B | 1,350 | 1,500 | 0.9 | 0.005-0.05 | >100 | 3,500 | $9.5 \times 10^8$ |
| C | 2,250 | 1,500 | 1.5 | 0.01-0.1 | >200 | 3,000 | $5.0 \times 10^8$ |
| D | 3,800 | 1,500 | 2.5 | 0.03-0.2 | >500 | 2,600 | $1.8 \times 10^8$ |
| E | 7,500 | 1,500 | 5.0 | 0.03-0.2 | >500 | 2,200 | $0.8 \times 10^8$ |
| F | 12,000 | 1,500 | 8.0 | 0.05-0.4 | >500 | 2,850 | $3.5 \times 10^8$ |
| G | 15,000 | 1,500 | 10.0 | 0.1-0.8 | >200 | 3,400 | $9.0 \times 10^9$ |
| H | 20,000 | 1,500 | 13.0 | 0.5-3.0 | 10-100 | 4,000 | $3.0 \times 10^8$ |
| Polycapramide alone | | 1,500 | | | | 6,500 | $9.0 \times 10^{12}$ |

[a] Measured at 260° C.

[b] $\dfrac{\text{Melt viscosity of polyether-polyamide block copolymer}}{\text{Melt viscosity of polycapramide}}$

[c] $\mu$=micron.

COMPARATIVE EXAMPLE 1

By carrying out the polycondensation reaction with different molar rations of ε-caprolactam to adipic acid, two poly-ε-capramides having a number average molecular weight of 1050 and 4010 wherein at least 99% of both terminal groups are carboxyl groups were sythesized. Poly-ε-capramide having a number average molecular weight of 1050 was melt-polycondensed with an equimolar amount of polyethylene glycol (both ends are hydroxyl groups) having a number average molecular weight of about 1010 by heating for 10 hours at 250° C. in the presence of 0.1% by weight of p-toluenesulfonic acid as a polycondensation catalyst while stirring in an atmosphere of nitrogen. In the same way, poly-ε-capramide having a number average molecular weight of 4010 was melt-polycondensed with an equimolar amount of polyethylene glycol (both ends are hydroxyl groups) having a number average molecular weight of 3950. These two polymers obtained by polycondensation had about 50% by weight of the polyethylene ether component. When poly-ε-capramide oligomer and polyethylene glycol having a number average molecular weight of about 1000 were used, a homogeneous transparent polymer in molten state was obtained. But when poly-ε-capramide oligomer and polyethylene glycol having a number average molecular weight of about 4000 were used, the polycondensation did not well proceed as a phase separation occurred because of the incompatibility of the two components. In these cases, the polyether component was bonded with the polyamide component to a low degree, and a high molecular weight polymer could not be obtained.

The first-mentioned two polymers were each mixed with poly-ε-capramide having a melt viscosity at 260° C. of 1500 poises, and the mixture was spun and drawn in the same manner as in Example 1 to give multifilaments of Y-shaped cross section for use in carpets which had a monofilament denier of 18. The content of the polyethylene ether in the filament was 1.8% by weight. The results are shown in Table 1-2.

The properties of the obtained filament are far inferior to B-G of Table 1—1 in their antistatic properties.

The experimental results of this Comparative Example indicate that the synthetic resin shaped article of the invention cannot be obtained from a polyether-polyamide block copolymer obtained by polycondensing polyamide with a polyalkylene ether which does not have an amino or carboxyl group at least one end.

TABLE 1-2

| Composition of block copolymer | | | Melt viscosity of block polymer (poises) | Dispersed state of the block copolymer | | Antistatic properties | |
|---|---|---|---|---|---|---|---|
| $\overline{Mn}$ of PEG | $\overline{Mn}$ of polyamide oligomer | PEG content (weight percent) | | Diameter at cross section of dispersed particles ($\mu$) | Length/diameter (dispersed particle) | Statically charged voltage on human body (v.) | Specific resistance of filament ($\Omega$.cm.) |
| 1,010 | 1,050 | 49.0 | 200 | <0.02 | <50 | 5,500 | $8.0 \times 10^9$ |
| 3,950 | 4,010 | 49.6 | 150 | <0.02 | <50 | 6,000 | $9.0 \times 10^9$ |

EXAMPLE 2

A salt of adipic acid and polyethylene ether diamine having a number average molecular weight of about 3500 produced in the same manner as in Example 1 was polymerized with ε-caprolactam to give a polyether-polyamide block copolymer having 50% by weight of a polyethylene ether portion. The obtained polyether-polyamide block copolymer had a melt viscosity at 270° C. in 1700 poises. This polyether-polyamide block copolymer was well mixed in a solid condition with each of several poly-ε-capramides having a different molecular weight at a weight ratio of 1:49, and the mixture was melt-spun at 270° C. by means of a lattice-type spinning apparatus (residence time 15 minutes, and draft 35). Subsequent cold drawing gave a 30-denier/6-filament yarn. The content of the polyetheramide in the yarn was 2% by weight based on the total amount, and the content of polyethylene ether, 1% by weight based on the total amount.

The melt viscosities of the poly-ε-capramides used in this example, the states of dispersion of the polyether-polyamide block copolymers in the filaments, specific resistances of these filaments, and the number of fluffs at the time of tricot warping are shown in Table 2.

It is seen from Table 2 that even if the same polyether-polyamide block copolymer is used, its dispersed state is remarkably affected by blending poly-ε-capramide having a different melt viscosity, and antistatic properties vary accordingly. When the melt viscosity of poly-ε-capramide is remarkably higher than that of the polyether-polyamide block copolymer (specimen I), the dispersed particles of the block copolymer are slender and short, and there appears a number of fluffs at the time of tricot warping. Hence, specimen I is inferior in antistatic properties, and is not satisfactory. Specimen J is also inferior in antistatic properties and the number of fluffs. On the other hand, when the melt viscosity of poly-ε-capramide is lower than that of the polyether-polyamide block copolymer (specimens K and L), the dispersed particles of the polyether-polyamide block copolymer extend exceedingly long in the direction of their longitudinal axis. The specimens K and L therefore have excellent antistatic properties and have only a small number of fluffs at the time of tricot warping.

One part of this polymer was kneaded in molten state with 6 parts of nylon 8 having a melt viscosity at 260° C. of 900 poises. A film having a width of 30 mm. was prepared by extruding the mixture from a slit-like spinneret and then drawing it. This film had therein the polyether-polyamide block copolymer component present as slender stripe-like particles arranged in the direction of the drawing. The particles had a diameter of 0.05–0.4μ, and a length of at least 100 times the diameter.

The so obtained film was cut in parallel with the drawing direction into a size of 10 mm. long. The specific resistance was found to be $7.5 \times 10^8$ Ω.cm. by calculating it from the resistance between both ends of the film.

In the same manner, a film consisting only of nylon 8 was prepared. It was found to have a specific resistance of $1.2 \times 10^{12}$ Ω.cm.

TABLE 2

| | Melt viscosity (poise)[a] | | | Dispersed state of polyether-polyamide block copolymer | | | |
|---|---|---|---|---|---|---|---|
| | Polyether-polyamide block copolymer | Poly-capramide | Ratio of melt viscosity[b] | Diameter at cross section of dispersed particles (μ) | Length/diameter (dispersed particle) | Specific resistance of filament (Ω.cm.) | Number of fluffs of time of tricot warping (per 10⁷ m.) |
| Specimen: | | | | | | | |
| I | 1,700 | 3,400 | 0.5 | <0.02 | <50 | $8.0 \times 10^9$ | 21.5 |
| J | 1,700 | 1,900 | 0.9 | 0.005–0.05 | >100 | $9.0 \times 10^8$ | 8.3 |
| K | 1,700 | 1,300 | 1.3 | 0.01–0.1 | >200 | $4.5 \times 10^8$ | 5.2 |
| L | 1,700 | 850 | 2.0 | 0.02–0.2 | >500 | $2.6 \times 10^8$ | 2.4 |

[a] Measured at 270° C.

[b] $\dfrac{\text{Melt viscosity of polyether-polyamide block copolymer}}{\text{Melt viscosity of polycapramide}}$

EXAMPLE 3

Thirty-one parts of a salt of hexamethylene diamine and polyethylene ether (polyethylene ether dicarboxylic acid) wherein at least 95% of the both end groups are carboxyl groups, which had a number average molecular weight of 3150, and 69 parts of hexamethylene diammonium adipate were dissolved into 100 parts of m-cresol, and the mixture was polycondensed by heating. First, it was heated for 3 hours at 230°C. in a sealed system, and then heated for one hour at 230° C. at atmospheric pressure while passing a nitrogen gas, followed by heating at 250° C. for 2 hours, and at 270° C. for one hour.

The obtained polymer (having a melt viscosity of 3000 poises at 285° C.) was made into a chip form, and water-soluble components were removed from it by extraction. Chips of nylon 66 (having a melt viscosity of 800 poises at 285° C.) were blended with chips of the above polymer, and the mixture was melt-spun at 285° C. The ratio of the polyether-polyamide block copolymer to nylon 66 was 1:4. There were obtained monofilaments which have a size of about 70 denier after having been drawn to 3.6 times. It was confirmed by the observation of the cross section and longitudinal section of the filaments that the dispersed polyether-polyamide block copolymer phase is present as very slender paralleled stripes having a diameter of 0.02–0.2μ (FIG. 1–c) and a length of about several hundred times the diameter. The so obtained filaments had an excellent antistatic effect.

TABLE 3.—SPECIFIC RESISTANCE

| | After scouring, Ω.cm. | After 10 times washing, Ω.cm. |
|---|---|---|
| Yarn of Example 3 | $2.4 \times 10^7$ | $2.1 \times 10^7$ |
| Yarn of Nylon 66 | $2.5 \times 10^{11}$ | $3.1 \times 10^{11}$ |

EXAMPLE 4

Polyether diamine was synthesized in the same manner as in Example 1 from a copolymer of propylene oxide and ethylene oxide (ratio of 1:3) having a number average molecular weight of 2050. It was reacted with an equimolar amount of terephthalic acid to form a salt. A polyether-polyamide block copolymer containing 35% by weight of the polyether component content was prepared by copolymerizing this salt with η-capryllactam. The melt viscosity of this block copolymer at 260° C. was 2700 poises.

Table 4

Specific resistance of the film
Antistatic nylon 8 _____ $7.5 \times 10^8$ Ω.cm.
Nylon 8 _____ $1.2 \times 10^{12}$ Ω.cm.

EXAMPLE 5

In the same manner as in Example 1, a polyether-polyamide block copolymer containing 50.0% by weight of a polyethylene ether component was prepared from polyethylene ether diamine having a number average molecular weight of 3400. This polymer had a melt-viscosity at 265° C. of 4500 poises. Chips of this polymer were mixed with chips of nylon 6 having a melt viscosity at 265° C. of 850 poises in a manner such that the resulting mixture might have a polyethylene ether content of 2.0% by weight on an average. Sheath-and-core type composite filaments were prepared by means of an ordinary co-spinning machine by using the resulting mixture as a first component and nylon 6 as a second component. The ratio of a sheath (first component) to a core (second component) was 50:50. The spinning was carried out with varying draft, take-up speed and monofilament denier. The residence time in the spinning apparatus was in each case 15 minutes. The results are shown in Table 5.

TABLE 5

| Spinning conditions | | | Dispersed state or polyether-polyamide block copolymer | | |
|---|---|---|---|---|---|
| Draft | Take up speed (m./min.) | Monofilament denier (denier) | Diameter at cross section of dispersed particles (μ) | Length in the longitudinal direction of dispersed particles (μ) | Specific resistance of filament (Ω.cm.) |
| 160 | 900 | 2 | 0.01–0.05 | (¹) | $1.6 \times 10^8$ |
| 32 | 450 | 10 | 0.03–0.2 | (¹) | $2.1 \times 10^8$ |
| 6 | 250 | 50 | 0.1–0–4 | (¹) | $9.5 \times 10^8$ |

¹ More than 10 microns, sometimes several hundred microns.

EXAMPLE 6

With the use of polyethylene ether diamine having a number average molecular weight of 4050, a polyether-polycapramide block copolymer having 40.0% by weight of the polyethylene ether diamine was prepared. The obtained block copolymer had a melt viscosity at 290° C. of 2000 poises. Separately, polyethylene terephthalate having a melt viscosity at 290° C. of 1000 poises was prepared. These two polymers were mix-spun by using a spinning machine of the type wherein these polymers were melted individually, and then kneaded by a screw. The obtained filaments were drawn in a customary manner, and their properties were measured.

TABLE 6

| Type of filament | Antistatic properties | | Tensile properties | | |
| --- | --- | --- | --- | --- | --- |
| | Specific resistance (Ω.cm.) | Frictionally charged voltage (v.) | Strength (g./d.) | Elongation (percent) | Initial tensile resistance (g./d.) |
| Filament of Example 6 | 9.2×10$^8$ | 1,200 | 3.8 | 31.0 | 113 |
| Filament of polyethylene terephthalate* | 5.3×10$^{11}$ | 5,100 | 4.9 | 30.0 | 112 |

* For comparison, polyethyleneterephthalate alone was spun.

The ratio of the polyether-polyamide block copolymer to be mixed was 2.5% by weight, and the average content of the polyethylene ether component in the filaments was 1.0% by weight. Observation by an electron microscope indicated that the polyether-polyamide block copolymer phase is present as dispersed very slender particles having a diameter of 0.1–1.0μ and a length of at least 100 times the diameter arranged in approximately parallel relationship with the fiber axis (FIG. 11).

EXAMPLE 7

A polyether-polyamide block copolymer containing 52.0% by weight of polyethylene ether diamine having a molecular weight of 6100 and a polyamide component which was a copolymer of ε-caprolactam and hexamethylene diammonium adipate (at a ratio of 85:15) was synthesized. This block polymer had a melt viscosity at 290° C. of 3500 poises. This block copolymer was mixed with polypropylene having a melt viscosity at 290° C. of 2500 poises at a ratio of 1:99, and the mixture was melt-spun at 290° C. The particles of the block copolymer phase in the filament had a diameter of 0.1–1.0μ and a length of several hundred times or more the diameter. The filaments had a specific electric resistance of 1.9×10$^9$Ω.cm., which is far smaller than that of polypropylene filaments (more than 10$^{13}$Ω.cm.), indicating excellent antistatic properties.

EXAMPLE 8

The polyether-polyamide block copolymer used in Example 1 (Table 1—1, Specimen D) was mixed with a copolymer of 80 parts of nylon 6 and 20 parts of nylon 66 (melt viscosity at 265° C. of 850 poises), and the mixture was melt-spun and drawn in the same manner as in Example 1. The content of the polyether component in the filament was 2.0% by weight. The dispersed particles of the polyether-polyamide block copolymer in the filament had a diameter of 0.03–0.2μ and a length of at least 100 times the diameter (FIG. 12). The filaments had a specific resistance of 9×10$^7$Ω.cm.

EXAMPLE 9

Polyethylene glycol was reacted with acrylonitrile in the presence of an alkali catalyst. Hydrogenation of the reaction product gave polyethylene ether diamine having a number average molecular weight of about 4150 wherein at least 95% of both end groups were amino groups. An equimolar amount of adipic acid was reacted with the polyethylene ether diamine to form a polyethylene ether diamine.adipic acid salt. The salt was mixed with ε-caprolactam, and melt-polycondensed for 12 hours at a temperature of 240° C. to form a polyetherpolyamide block copolymer having 40% by weight of the polyethylene ether portion. The obtained block copolymer had a melt viscosity at 265° C. of 4500 poises. The so obtained polyether-polyamide block copolymer in solid chip form was well mixed with polycapramide having a melt viscosity at 265° C. of 900 poises. The mixture was spun by a hot plate heating type melt-spinning apparatus (spinning temperature, 265° C.; residence time 20 minutes; draft 32.0), and then cold drawn to 3.6 times the original length to give 70 denier/24 filament multifilaments. The ratio of polyether-polyamide block copolymer was 5% by weight based on the total amount. Hence, the content of the polyether component in the filament was about 2% by weight. Observation by an electron microscope of the cross section of this filament indicated that the dispersed articles of the polyether-polyamide block copolymer have a diameter between 0.01μ and 0.1μ and a length in the direction of the longitudinal axis of at least several hundred times the diameter (FIG. 1–a, and FIG. 2). The tensile properties and static properties are shown in Table 7. It is clear from it that the filaments obtained have very excellent antistatic properties.

COMPARATIVE EXAMPLE 2

A salt of adipic acid and polyethylene ether diamine having a number average molecular weight of about 9500 was copolymerized with ε-caprolactam to give a polymer having 2.0% by weight on an average of the polyethylene ether portion. The obtained polymer was a mixture of block copolymerized polyetheramide and polycapramide homopolymer. The mixture was melt-spun by a hot plate heating type melt-spinning apparatus in the same manner as in Example 9, and drawn to give filaments (70 denier/24 filament). It was discovered that the block copolymer is present in the filament as short cylindrical particles having a diameter at cross section of 0.01–0.05μ and a length in the longitudinal direction of 0.03–0.2μ (FIGS. 3–a and 3b).

COMPARATIVE EXAMPLE 3

Two parts of polyethylene glycol having a number average molecular weight of about 2000 was mixed with 98 parts of polycapramide, and agitated for half an hour at 250° C. in an atmosphere of nitrogen. The so prepared polymer blend was melt-spun by a hot plate heating type melt-spinning apparatus in the same manner as in Example 9, and drawn to give filaments (70 denier/24 filament). The particles of polyethylene glycol dispersed in the filament were arranged in approximately parallel relationship with the fiber axis, and had a diameter of 0.2–0.6μ and a length of several microns, and 20–30μ at the longest. It was found that a polyethylene glycol phase dyed black was clearly separated from an undyed polyamide phase in the mixture (FIGS. 4 and 5–a, and 5–b) as compared with the case of Example 9.

TABLE 7

| Type of filament | Antistatic properties | | Tensile properties | | |
| --- | --- | --- | --- | --- | --- |
| | Specific resistance (Ω.cm.) | Frictionally charged voltage (v.) | Strength (g./d.) | Elongation (percent) | Initial tensile resistance (g./d.) |
| Example 9 | 7.2×10⁷ | 950 | 5.6 | 38.5 | 27.5 |
| Comparative Example 2 | 2.5×10⁹ | 2,700 | 5.1 | 38.0 | 25.0 |
| Comparative Example 3 | 6.1×10⁹ | 3,200 | 4.6 | 37.5 | 28.0 |
| Nylon 6 | 1.6×10¹¹ | 4,600 | 5.4 | 39.0 | 27.5 |

EXAMPLE 10

A salt (62.4% by weight) of sebacic acid and polyethylene ether diamine having a number average molecular weight of about 5100 was mixed with 37.6% by weight of ε-caprolactam. The obtained polyether-polyamide block copolymer had about 60% by weight of the polyethylene ether portion, and had a melt viscosity at 270° C. of 5000 poises.

One part of the polyether-polyamide block copolymer in chip form was mixed with 14 parts of polycapramide having a melt viscosity at 270° C. of 850 poises, and the mixture was melt-spun at 270° C. at a draft of 28.0, and cold drawn to give staples having a monofilament denier of 15. The polyethylene ether content in the staple was about 4% on an average. Observation of the cross and vertical sections of the staple by an electron microscope indicated that the polyether-polyamide block copolymer is present as long linear particles extending approximately in parallel relationship with the fiber axis (longitudinal direction). The dispersed particles had a diameter of about $0.05–0.2\mu$ and a length of at least 100 times, and mostly several hundred times, the diameter (FIG. 1-b and FIG. 6).

COMPARATIVE EXAMPLE 4

A salt of adipic acid and polyethylene ether diamine having a number average molecular weight of 800 was co-polymerized with ε-caprolactam in the same manner. The obtained polymer had 4% by weight of the polyethylene ether component. This polymer was melt-spun and drawn. Observation of the resulting filament by an electron microscope indicated that the polyethylene ether segment is almost uniformly dispersed, and is not detected particularly as an independent phase.

COMPARATIVE EXAMPLE 5

A salt of adipic acid and polyethylene ether diamine having a number average molecular weight of 1500 was polymerized with ε-caprolactam to form a polyether-polyamide block copolymer having 80% by weight of the polyethylene ether component and having a melt viscosity at 270° C. of 6000 poises. Five parts of the block copolymer was mixed with 95 parts of polycapramide having a melt viscosity at 270° C. of 850 poises, and the mixture was spun and drawn in the same manner as in Example 10. Observation of the cross section of the obtained filament indicated that the polyether-polyamide block copolymer is mixed therein as very large particles having a diameter of at least $0.4\mu$ and mostly at least $1.0\mu$.

TABLE 8-1

| Type of filament | Antistatic properties | | Tensile properties | | |
| --- | --- | --- | --- | --- | --- |
| | Specific resistance (Ωcm.) | Frictionally charged voltage (v.) | Strength (g./d.) | Elongation (percent) | Initial tensile resistance (g./d.) |
| Example 10 | 1.5×10⁷ | 580 | 5.5 | 40.5 | 26.5 |
| Comparative Example 4 | 7.8×10⁹ | 3,450 | 5.4 | 41.0 | 22.0 |
| Comparative Example 5 | 2.0×10⁹ | 2,500 | 4.8 | 41.0 | 26.0 |

The obtained filaments were dyed by various dyestuffs, and their fastness to sunlight was measured (Table 8-2).

Measuring apparatus—Fade-O-meter (Atras, U.S.A.)
Light source—Carbon arc (130 V, 15A)
Temperature—40° C.
Standard for determination—Japanese Industrial Standard L–1044–1959 "Testing method for fastness of dyeings and dyestuffs"

TABLE 8-2.—FASTNESS TO SUNLIGHT

| | Specimen | | |
| --- | --- | --- | --- |
| Dyestuff | Example 10 | Comparative Example 4 | Comparative Example 5 |
| Alizarine Sky Blue R | 3 | 3 | 2 |
| Video Nylon Fast Yellow GL | 4 | 3 | 2 |
| Lanasyn Scarlet GL | 3 | 3 | 2 |
| Irgalan Yellow 2RL | 4 | 4 | 2 |
| Resoline Brilliant Blue PRL | 3 | 3 | 2 |

EXAMPLE 11

In the same manner as in Example 1, polyethylene ether diamine having a number average molecular weight of about 6050 was synthesized. It was reacted with an equimolar amount of adipic acid to form a salt of adipic acid and polyethylene ether diamine. The salt was mixed with ε-caprolactam, and melt-polycondensed. There were formed four polyether-polyamide block copolymers having 15, 30, 45 and 60% by weight, respectively, of the polyethylene ether component and each having a melt viscosity at 265° C. of 3500–4000 poises. Each of the obtained block copolymers in solid chip form was well mixed with polycapramide having a melt viscosity at 265° C. of 900 poises, and the mixture was spun by a hot plate heating type melt-spinning apparatus at 265° C. (residence time 15 minutes, and draft 67.0). The filaments were drawn to 3.5 times their original length to give 70 denier/34 filament miltifilaments. The ratio of mixing the polyether-polyamide block copolymer with polycapramide was such that the resulting filament had 3.0% by weight of the polyether component.

The dispersed state of the polyether-polyamide block copolymer in the filament was observed by an electron microscope and an optical microscope by using a method in which a specimen is dyed with osmic acid and dissolved in formic acid (FIGS. 7 and 8). It is seen from Table 9 that antistatic effect is more remarkable when the dispersed particles of the polyether-polyamide block copolymer extend longer in parallel relationship with the fiber axis.

TABLE 9

| Polyether component in the block copolymer (weight percent) | Polyether component in the filament (weight percent) | Dispersed state of polyether-polyamide block copolymer | | Specific resistance of filament (Ω.cm.) |
| --- | --- | --- | --- | --- |
| | | Diameter at cross section of dispersed particles ($\mu$) | Length/diameter (dispersed particle) | |
| 15 | 3.0 | <0.01 | <50 | 3.0×10⁹ |
| 30 | 3.0 | 0.02–0.08 | >500 | 2.5×10⁸ |
| 45 | 3.0 | 0.03–0.3 | >1,000 | 5.0×10⁷ |
| 60 | 3.0 | 0.02–0.1 | >1,000 | 6.0×10⁷ |

EXAMPLE 12

A salt of adipic acid and polyethylene ether diamine having a number average molecular weight of 1500 was melt-polymerized with ε-caprolactam to give a polyether-polyamide block copolymer having 45% by weight on an average of the polyethylene ether chain content. The obtained block copolymer had a melt viscsity at 270° C. of 6000 poises. The obtained polyether-polyamide block copolymer and poly-ε-capramide having a melt viscosity at 270° C. of 1200 poises were well mixed in solid chip form at a weight ratio of 1:21.5. The mixture was melt-spun at 270° C. by means of a hot plate heating type spinning apparatus, and then cold drawn to give 30 denier/6 filament multifilaments. The filaments had a polyethylene ether chain content of 2% by weight. The draft was 35, and the time of residence in the spinning apparatus was 15 minutes. The dispersed state of the polyether-polyamide block copolymer in the filament and the specific resistance of the filament are shown in Table 10.

COMPARATIVE EXAMPLE 6

Polyethylene ether diamine (same as that used in Example 12) having a number average molecular weight of 1500 and ε-caprolactam were melt-polymerized in the presence of a small amount of acetic acid to give a polyether-polyamide-block copolymer having a melt viscosity at 270° C. of 600 poises which had 45% by weight on an average of the polyethylene ether chain portion. The obtained block copolymer and poly-ε-capramide having a melt viscosity at 270° C. of 1200 poises were mixed at a weight ratio of 1:21.5, and the mixture was spun under the same conditions as in Example 12. The dispersed state of the polyether-polyamide block copolymer in the filament and the specific resistance of the filament are given in Table 10 together with the results obtained with respect to the filament of poly-ε-capramide.

The molecular weight of 1500 of the polyethylene ether chain corresponds to 34 as the number of ether-linked oxygen atoms. Thus, the number of ether-linked oxygen atoms of the polyether segment in Example 12 is considerably smaller than 45 which is the lower limit of the preferable range of said number. In spite of this, it is seen from Table 10 that if a melt viscosity ratio of 5.0, a draft of 35 and a residence time of 15 minutes are selected, there is obtained a filament having a specific resistance of $3.7 \times 10^8 \Omega$ cm. which indicates pretty good antistatic properties, but that the choice of a melt viscosity ratio of 0.5, a draft of 35 and a residence time of 15 minutes give a filament having a specific resistance of $98.0 \times 10^8 \Omega$ cm. which is indicative of unsatisfactory antistatic properties.

polymer comprising 15–85% by weight based on the weight of said block copolymer and 0.1–20% by weight based on the weight of said shaped article, said slender particles being dispersed in said melt-shapable synthetic resin as a phase independent of the phase of said melt-shapable synthetic resin, the longitudinal axis of said slender particles being substantially parallel to the direction of molecular orientation thereof, at least 80% by weight of said slender particles having a cross-sectional diameter of not more than $1.0\mu$ and a length along the longitudinal axis of at least 20 times the cross-sectional diameter of said slender particles.

2. The shaped article of claim 1 wherein the cross-sectional diameter of said slender particles is not more than $1\mu$ and the ratio of the length along the longitudinal axis to the cross-sectional diameter is at least 100.

3. The shaped article of claim 1 wherein the cross-sectional diameter of said particles is not more than $0.4\mu$, and the ratio of the length along the longitudinal axis to the cross-sectional diameter is at least 200.

4. The shaped article of claim 1 wherein said polyetherpolyamide block copolymer is prepared from ε-caprolactam and a salt of a polyethylene ether diamine and a dicarboxylic acid.

5. The shaped article of claim 1 wherein said melt-shapable synthetic resin is a polyamide.

6. The shaped article of claim 1 wherein said shaped article is selected from filaments, bristles and films.

TABLE 10

| | Composition of the block copolymer | | Melt viscosity (poises) | | | Spinning conditions | | Dispersed state of polyether-polyamide block copolymers | | Specific resistance (Ω.cm.) |
|---|---|---|---|---|---|---|---|---|---|---|
| | Molecular weight of polyethylene ether diamine | Content of polyethylene ether chain (weight percent) | Polyether-polyamide block copolymer | Poly-ε-capramide | Melt visiosity ratio | Draft | Residence time (min.) | Diameter at cross section of dispersed particles (μ) | Length along longitudinal axis/diameter (dispersed particles) | |
| Example 12 | 1,500 | 45 | 6,000 | 1,200 | 5.0 | 35 | 15 | 0.02–0.2 | <500 | $3.7 \times 10^8$ |
| Comparative Example 6 | 1,500 | 45 | 600 | 1,200 | 0.5 | 35 | 15 | >0.03 | >50 | $98.0 \times 10^8$ |
| Poly-ε-capramide | | 0 | | 1,200 | | 35 | 15 | | | $9.0 \times 10^{12}$ |

We claim:

1. An antistatic shaped article of a melt-shapable synthetic resin selected from polyamides, polyesters and polyolefins having dispersed therein slender particles of a polyalkylene ether-polyamide block copolymer, the melt viscosity ratio of said block copolymer to said melt-shapable synthetic resin being 0.9–10:1, the polyamide segments of said block copolymer having repeating carbonamide groups as an integral part of the polymeric chain, the polyalkylene ether segments of said block co- References Cited

UNITED STATES PATENTS

| 3,369,057 | 2/1968 | Twilley | 260—857 |
| 3,493,632 | 2/1970 | Okazaki | 260—857 |
| 3,514,498 | 5/1970 | Okazaki et al. | 260—857 |
| 3,522,329 | 7/1970 | Okazaki et al. | 260—857 |

PAUL LIEBERMAN, Primary Examiner

U.S. Cl. X.R.

161—173, 175; 260—78, 857 L; 264—171, 173, 210 F, DIG 29

S-278

UNITED STATES PATENT OFFICE
CERTIFICATE OF CORRECTION

Patent No. 3,639,502         Dated February 1, 1972

Inventor(s) OKAZAKI ET AL

It is certified that error appears in the above-identified patent and that said Letters Patent are hereby corrected as shown below:

Page 4, column 7, in the formula of lines 50-54, delete "(n=5-11)" of line 54.

Page 6, in Table 1-1, the 7th entry under the heading Specific resistance of filament ($\Omega$.cm.), delete "9.0X10⁹" and insert -- $9.0 \times 10^8$ --.

Page 6, Table 1-1, the 7th entry under the heading Specific resistance of filament ($\Omega$.cm.), delete " $3.0 \times 10^8$" and insert -- $3.0 \times 10^9$ --.

Page 10, in Table 10, the 2nd entry under the heading Diameter at cross section of dispersed particles ($\mu$), delete ">0.03" and insert -- 0.03> --.

Page 10, in Table 10, the first entry under the heading Length along longitudinal axis/diameter (dispersed particles), delete "<500" and insert -- 500< --.

Page 10, in Table 10, the 2nd entry under the heading Length along longitudinal axis/diameter (dispersed particles), delete ">50" and insert -- 50> --.

Signed and sealed this 13th day of June 1972.

(SEAL)
Attest:

EDWARD M. FLETCHER, JR.
Attesting Officer

ROBERT GOTTSCHALK
Commissioner of Patents